US007870485B2

(12) United States Patent
Seliutin et al.

(10) Patent No.: US 7,870,485 B2
(45) Date of Patent: Jan. 11, 2011

(54) METHOD AND APPARATUS FOR GENERATING MULTIPLE DOCUMENTS USING A TEMPLATE AND A DATA SOURCE

(75) Inventors: Alexander Seliutin, Antelope, CA (US); Jeffrey D. Stegall, West Sacramento, CA (US); Sergey Alduokhov, Rancho Cordova, CA (US)

(73) Assignee: Intuit Inc., Mountain View, CA (US)

(*) Notice: Subject to any disclaimer, the term of this patent is extended or adjusted under 35 U.S.C. 154(b) by 1017 days.

(21) Appl. No.: 11/495,851

(22) Filed: Jul. 27, 2006

(65) Prior Publication Data
US 2008/0028293 A1  Jan. 31, 2008

(51) Int. Cl.
*G06F 17/24* (2006.01)
(52) U.S. Cl. ............... 715/271; 715/255; 715/209
(58) Field of Classification Search ......... 715/209–210, 715/243–253, 214, 271–272, 234
See application file for complete search history.

(56) References Cited

U.S. PATENT DOCUMENTS

| 5,995,724 | A  | * | 11/1999 | Mikkelsen et al. | 358/1.16 |
|---|---|---|---|---|---|
| 6,505,980 | B1 | * | 1/2003 | Allday | 400/61 |
| 7,133,868 | B1 | * | 11/2006 | Ruest et al. | 707/5 |
| 7,363,581 | B2 | * | 4/2008 | Parks et al. | 715/235 |
| 7,464,083 | B2 | * | 12/2008 | Otter et al. | 1/1 |
| 7,511,845 | B2 | * | 3/2009 | Inikori | 358/1.15 |
| 7,640,496 | B1 | * | 12/2009 | Chaulk et al. | 715/243 |
| 2002/0143818 | A1 | * | 10/2002 | Roberts et al. | 707/513 |
| 2003/0028550 | A1 | * | 2/2003 | Lee et al. | 707/200 |
| 2004/0158498 | A1 | * | 8/2004 | Sherman et al. | 705/26 |
| 2005/0216830 | A1 | * | 9/2005 | Turner et al. | 715/513 |
| 2005/0278692 | A1 | * | 12/2005 | Sridhar et al. | 717/106 |
| 2006/0064428 | A1 | * | 3/2006 | Colaco et al. | 707/101 |
| 2006/0271841 | A1 | * | 11/2006 | Thanu et al. | 715/503 |

(Continued)

OTHER PUBLICATIONS

Cindy Meister; Cindy Meister's INTER-Solution mail merge Group multiple items for a single condition.pdf; http://web.archive.org/web/20031005110239/http://homepage.swissonl ine.ch/cindymeister/mergfaq1.htm.*

(Continued)

*Primary Examiner*—Doug Hutton
*Assistant Examiner*—Benjamin J Smith
(74) *Attorney, Agent, or Firm*—Park, Vaughan, Fleming & Dowler LLP

(57) ABSTRACT

A system that generates multiple documents using a template document and a data source. During operation, the system receives the data source, which includes parent records, child records, and metadata which describes the data stored in the parent and child records. Next, the system receives the template document which includes tables. The system then generates a flat data source from the data source, wherein the flat data source includes column names for the tables in the template document. Next, the system generates an intermediate document using the template document by concatenating multiple replicas of the template document to obtain an initial version of the intermediate document and by using the flat data source to populate the column names in the tables within the initial version of the intermediate document. The system then generates a final document by using the child records to populate rows in the tables within the intermediate document.

21 Claims, 13 Drawing Sheets

U.S. PATENT DOCUMENTS

2007/0038929 A1* 2/2007 Miyazawa .................. 715/517
2007/0089053 A1* 4/2007 Uhlig et al. .................. 715/513

OTHER PUBLICATIONS

Cindy Meister; mofeel groups -microsoft-public-word-mailmerge-fiel multiple items for singe condition.pdf; http://www.mofeel.net/1054-microsoft-public-word-mailmerge-fields/7122.aspx.*

Doug Robbins; tech-archive master detail with mail merge.pdf; http://www.tech-archive.net/Archive/Word/microsoft.public.word.mailmerge.fields/2005-05/msg00487.html.*

Microsoft; MS support How to work around duplicate names in mail merge data.pdf; http://support.microsoft.com/default.aspx?scid=kb;en-us;302665.*

Microsoft; MS support How to use mail merge to create a list sorted by category in Word 2000.pdf; http://support.microsoft.com/default.aspx?scid=kb;en-us;211303.*

* cited by examiner

RECEIPT 102

VENDOR NAME 110
VENDOR ADDRESS 112
VENDOR PHONE NUMBER 114

| DATE | INVOICE # |
|---|---|
| DATE 122 | INVOICE 124 |

BILL TO:
CUSTOMER NAME 116
CUSTOMER ADDRESS 118
CUSTOMER PHONE NUMBER 120

| ITEM # | DESCRIPTION | QUANTITY | UNIT PRICE | AMOUNT |
|---|---|---|---|---|
| 104 | BASEBALL BAT | 1 | $6.00 | $6.00 |
| 106 | BASEBALL BALL | 4 | $2.00 | $8.00 |
| 108 | BASEBALL MITT | 1 | $10.00 | $10.00 |
| | | | TOTAL | $24.00 |

FIG. 1

TEMPLATE DOCUMENT 302

Dear <<CUSTOMER NAME>>,

Thank you for purchasing merchandise from us. Here are the items you bought:

Receipt Number: <<RECEIPTNO>>

| <<ITEMNO>> | <<DESCRIPTION>> | <<QUANTITY>> | <<UNITPRICE>> | <<AMOUNT>> |
|---|---|---|---|---|
|  |  |  |  |  |

TOTAL      <<TOTAL>>

Have a nice day!

Regards,

<<VENDOR NAME>>
<<DATE>>

FIG. 3A

<<CUSTOMER NAME>>
<<RECEIPTNO>>
<<ITEMNO>>
<<DESCRIPTION>>
<<QUANTITY>>
<<UNITPRICE>>
<<AMOUNT>>
<<TOTAL>>
<<VENDOR NAME>>
<<DATE>>

FIG. 3B

INTERMEDIATE TEMPLATE DOCUMENT 502

Dear CUSTOMER NAME 116,

Thank you for purchasing merchandise
from us. Here are the items you bought:

Receipt Number: 102

| ITEM # | DESCRIPTION | QUANTITY | UNIT PRICE | AMOUNT |
|--------|-------------|----------|------------|--------|
|        |             |          |            |        |

TOTAL $24.00

Have a nice day!

Regards,

VENDOR NAME 110
DATE 122

FIG. 5A

INTERMEDIATE TEMPLATE DOCUMENT 504

Dear CUSTOMER NAME 404,

Thank you for purchasing merchandise from us. Here are the items you bought:

Receipt Number: 406

| ITEM # | DESCRIPTION | QUANTITY | UNIT PRICE | AMOUNT |
|---|---|---|---|---|
|  |  |  |  |  |

|  |  |  | TOTAL | TOTAL 408 |

Have a nice day!

Regards,

VENDOR NAME 110
DATE 410

FIG. 5B

INTERMEDIATE TEMPLATE DOCUMENT 506

Dear CUSTOMER NAME 412,

Thank you for purchasing merchandise
from us. Here are the items you bought:

Receipt Number: 414

| ITEM # | DESCRIPTION | QUANTITY | UNIT PRICE | AMOUNT |
|---|---|---|---|---|
|  |  |  |  |  |
|  |  |  | TOTAL | TOTAL 416 |

Have a nice day!

Regards,

VENDOR NAME 110
DATE 418

FIG. 5C

FIELD MAP 602

| TABLE 1 | <<ITEMNO>> | <<DESCRIPTION>> | <<QUANTITY>> | <<UNITPRICE>> | <<AMOUNT>> |
|---|---|---|---|---|---|
| | COLUMN 1 | COLUMN 2 | COLUMN 3 | COLUMN 4 | COLUMN 5 |

FIG. 6A

FIELD MAP 604

| | COLUMN 1 | COLUMN 2 | COLUMN 3 | COLUMN 4 |
|---|---|---|---|---|
| TABLE 606 | <<FIELD 612>> | <<FIELD 614>> | <<FIELD 616>> | <<FIELD 618>> |
| TABLE 608 | <<FIELD 620>> | <<FIELD 622>> | | |
| TABLE 610 | | <<FIELD 624>> | <<FIELD 626>> | <<FIELD 628>> |

FIG. 6B

*FINAL DOCUMENT 702*

Dear CUSTOMER NAME 116,

Thank you for purchasing merchandise from us. Here are the items you bought:

Receipt Number: 102

| ITEM # | DESCRIPTION | QUANTITY | UNIT PRICE | AMOUNT |
|---|---|---|---|---|
| 104 | BASEBALL BAT | 1 | $6.00 | $6.00 |
| 106 | BASEBALL | 4 | $2.00 | $8.00 |
| 108 | BASEBALL MITT | 1 | $10.00 | $10.00 |
| | | | TOTAL | $24.00 |

Have a nice day!

Regards,

VENDOR NAME 110
DATE 122

FIG. 7A

FINAL DOCUMENT 704

Dear CUSTOMER NAME 404,

Thank you for purchasing merchandise
from us. Here are the items you bought:

Receipt Number: 406

| ITEM # | DESCRIPTION | QUANTITY | UNIT PRICE | AMOUNT |
|---|---|---|---|---|
| ITEM 706 | DESCRIPTION 708 | QUANTITY 710 | UNIT PRICE 712 | AMOUNT 714 |
| | | | TOTAL | TOTAL 408 |

Have a nice day!

Regards,

VENDOR NAME 110
DATE 410

FIG. 7B

― FINAL DOCUMENT 716

Dear CUSTOMER NAME 412,

Thank you for purchasing merchandise
from us. Here are the items you bought:

Receipt Number: 414

| ITEM # | DESCRIPTION | QUANTITY | UNIT PRICE | AMOUNT |
|---|---|---|---|---|
| ITEM 718 | DESCRIPTION 720 | QUANTITY 722 | UNIT PRICE 724 | AMOUNT 726 |
| ITEM 728 | DESCRIPTION 730 | QUANTITY 732 | UNIT PRICE 734 | AMOUNT 736 |
| | | | TOTAL | TOTAL 416 |

Have a nice day!

Regards,

VENDOR NAME 110
DATE 418

FIG. 7C

METHOD AND APPARATUS FOR GENERATING MULTIPLE DOCUMENTS USING A TEMPLATE AND A DATA SOURCE

BACKGROUND

Related Art

Word processing applications provide a mechanism to generate multiple documents from a single template document. This document-generation mechanism is commonly referred to as "mail merge." The mail merge process begins when a user creates a template document. The template document typically contains text and mail-merge fields which are placeholders for data. The mail merge process uses a data source to associate the mail-merge fields with a set of records. After creating the template document, the user executes mail merge. For each record in the data source, mail merge creates a replica of the template document and populates the mail-merge fields within the replica with the data contained in the record. In this manner, mail merge can generate multiple documents using a template and a data source.

Unfortunately, mail merge cannot be used for generating documents by using a data source that contains hierarchical records. For example, suppose we want to send letters to customers with a list of items that they bought during the past year. The data source may include a set of sales receipts, which often contain hierarchical records. Specifically, a sales receipt usually includes parent records which contain data related to the transaction as a whole, such as, the customer's name, the customer's address, etc. The sales receipt may also include one or more child records which contain information related to an individual item that a customer purchased, such as, the item description, the item price, etc. The letter template usually contains mail-merge fields for the customer's name, the customer's address, etc. which can be resolved using the parent records. However, note that the letter template cannot contain a list of mail-merge fields that describe the items that a customer bought during the past year because each customer typically buys a different set of items. Hence, mail merge cannot be used to generate letters to customers that contains a list of items that the customer bought during the past year.

SUMMARY

One embodiment of the present invention provides a system that generates multiple documents using a template document and a data source. During operation, the system receives the data source, which includes parent records, child records, and metadata which describes the data stored in the parent and child records, wherein a parent record is associated with one or more child records. Next, the system receives the template document which includes one or more tables. The system then generates a flat data source from the data source, wherein the flat data source includes column names for the one or more tables in the template document. Next, the system generates an intermediate document using the template document by concatenating multiple replicas of the template document to obtain an initial version of the intermediate document. The system then uses the flat data source to populate the column names in the tables within the initial version of the intermediate document. Next, the system generates a final document by using the child records to populate rows in the tables within the intermediate document.

In a variation on this embodiment, while generating the intermediate document using the template document, the system uses mail merge functionality to concatenate multiple replicas of the template document to obtain the initial version of the intermediate document and to use the flat data source to populate the column names in the tables within the initial version of the intermediate document.

In a variation on this embodiment, after obtaining the initial version of the intermediate document, the system uses the parent records to populate the fields that are not in the tables within the intermediate document.

In a further variation, the system uses the parent records to populate the fields that are not in the tables by performing the following actions: for each parent record whose data is to be included in the final document, the system identifies a section of the intermediate document that is associated with the parent record, and populates fields that are not in the tables within the identified section using data from the parent record.

In a further variation, while generating the flat data source, the system imports values for the fields that are not in the tables from the parent records into the flat data source, and imports column names for the tables from the metadata into the flat data source.

In a variation on this embodiment, after generating the intermediate document, the system generates a mapping between the columns in the tables within the template document and the columns in the child records.

In a further variation, while generating the final document, for each parent record whose data is to be included in the final document, the system identifies a section in the intermediate document that is associated with the parent record. For each table in the identified section, the system uses the mapping to identify columns in the child records associated with the parent record that are to be imported into the table, and imports the values stored in the identified columns into the table.

In a variation on this embodiment, the records can include a purchase order document, a customer order document, a receiving document, a sales receipt, a transfer document, an adjustment memo, a work order document, or a lay away document.

BRIEF DESCRIPTION OF THE FIGURES

FIG. 1 presents an exemplary receipt in accordance with an embodiment of the present invention.

FIG. 3A presents an exemplary template document in accordance with an embodiment of the present invention.

FIG. 3B presents a list of fields extracted from the exemplary template document in accordance with an embodiment of the present invention.

FIG. 5A presents an exemplary intermediate document that corresponds to the exemplary receipt in FIG. 1 in accordance with an embodiment of the present invention.

FIG. 5B presents another exemplary intermediate document in accordance with an embodiment of the present invention.

FIG. 5C presents yet another exemplary intermediate document in accordance with an embodiment of the present invention.

FIG. 6A presents an exemplary field map in accordance with an embodiment of the present invention.

FIG. 6B presents another exemplary field map in accordance with an embodiment of the present invention.

FIG. 7A presents an exemplary final document that corresponds to the intermediate document in FIG. 5A in accordance with an embodiment of the present invention.

FIG. 7B presents an exemplary final document that corresponds to the intermediate document in FIG. 5B in accordance with an embodiment of the present invention.

FIG. 7C presents an exemplary final document that corresponds to the intermediate document in FIG. 5C in accordance with an embodiment of the present invention.

DETAILED DESCRIPTION

Figure 2:
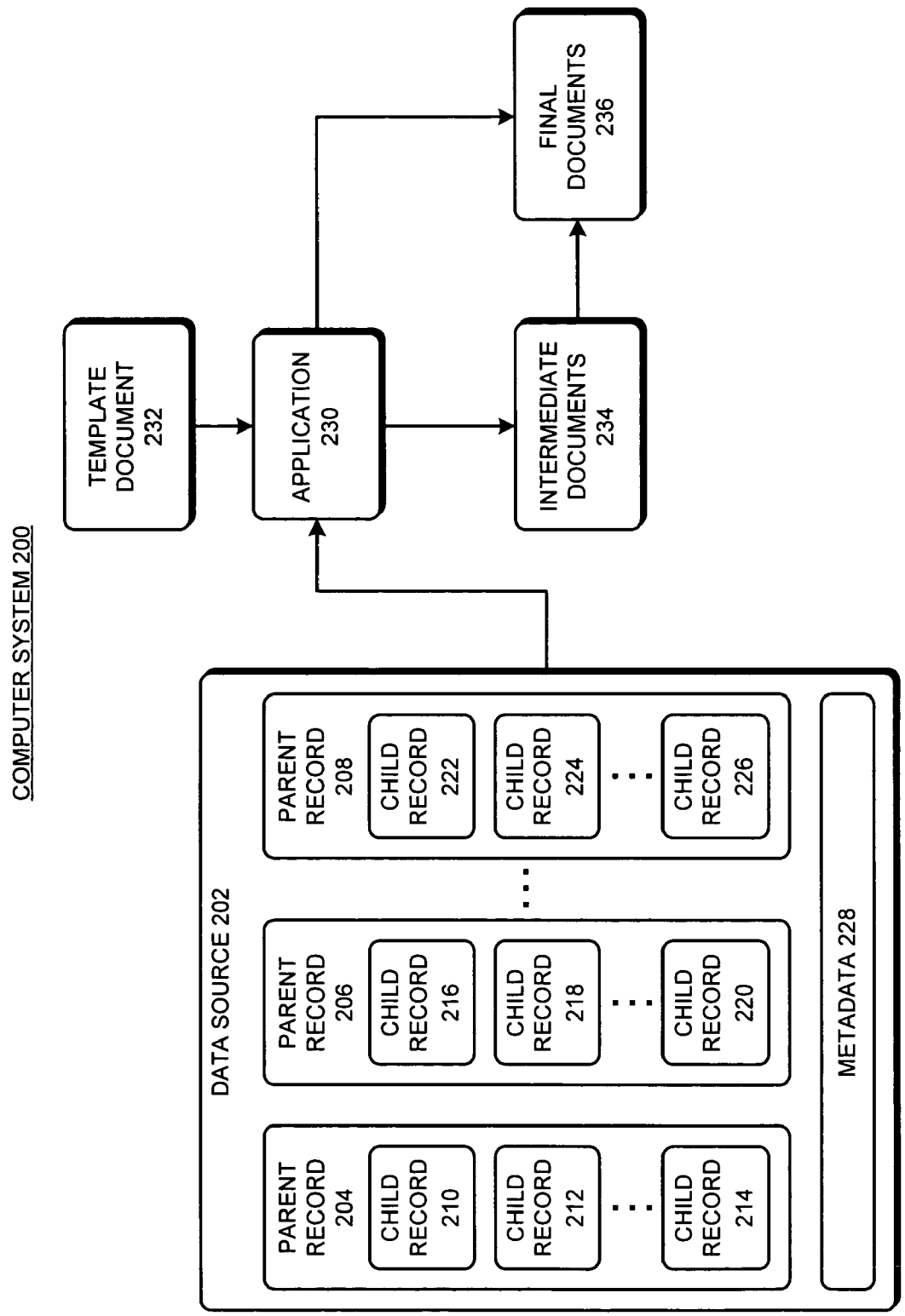
FIG. 2 presents a block diagram of a computer system used to generate multiple documents from a template document in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention generates multiple documents from a template document and a data source. In this embodiment, the data source includes one or more parent records, wherein each parent record includes one or more child records. In one embodiment of the present invention, the template document includes one or more tables which are to be populated with data from the child records.

In one embodiment of the present invention, the parent and child records are generated from a transaction between a vendor and a customer.

One embodiment of the present invention uses mail merge to populate mail merge fields that are not in tables with data from the parent records. Another embodiment of the present invention uses mail merge to populate mail merge fields in tables with the name of the mail merge field. In one embodiment of the present invention, the name of the mail merge field is the name of a column in the child record that is to be imported into the mail merge field.

In one embodiment of the present invention, after mail merge populates the mail merge fields within the template document with data from the parent records and with names for the mail merge fields in the table, a mapping between the mail merge fields in the tables within the template document and the columns in the child records is created. In one embodiment of the present invention, while importing the data from the child records, the mapping is used to determine which columns within the child records are to be imported into the columns within the tables in the intermediate documents. The final documents are generated after all child records have been imported into the intermediate documents.

Transaction Document

In one embodiment of the present invention, the parent records are transaction documents, wherein each parent record includes information about a given transaction. In another embodiment of the present invention, the each child record is an item related to a given transaction. In one embodiment of the present invention, a parent record can be associated with one or more child records.

In one embodiment of the present invention, a transaction document can include, but is not limited to, a purchase order document, a customer order document, a receiving document, a sales receipt, a transfer document, an adjustment memo, a work order document, and a lay away document.

Note that although the discussion in FIGS. 1 to 7C refers to a sales receipt, the present invention can be applied to any transaction document. FIG. 1 presents an exemplary sales receipt 102 in accordance with an embodiment of the present invention which includes items 104-108 purchased by a customer. As illustrated in FIG. 1, the first row of the table in receipt 102 indicates that the customer purchased one baseball bat (item 104) at a unit price of $6.00 per bat, for a total of $6.00. The customer also purchased four baseball balls each with a unit price of $2.00 per ball, for a total of $8.00 (item 106), and purchased one baseball mitt with a unit price of $10.00 per mitt, for a total of $10.00 (item 108). The total of all items in sales receipt 102 is $24.00. Note that the number of items contained in sales receipt 102 can be more or less depending on the number of items purchased by the customer. Sales receipt 102 also includes vendor name 110, vendor address 112, vendor phone number 114, customer name 116, customer address 118, customer phone number 120, date 122, and invoice number 124. Note that sales receipt 102 can contain more or less fields depending on the fields that the vendor selects to be included in a given receipt.

In one embodiment of the present invention, a vendor has one or more transaction documents from which the vendor desires to generate multiple final documents.

Data Source

FIG. 2 presents a block diagram of computer system 200 used to generate multiple documents from template document 232 in accordance with an embodiment of the present invention. Computer system 200 includes data source 202 and application 230. In one embodiment of the present invention, data source 202 and application 230 are on different computer system. For example, data source 202 can be on a database server and application 230 can be on an application server.

Data source 202 includes parent records 204, 206, and 208. Child records 210, 212, and 214 are associated with parent record 204, child records 216, 218, and 220 are associated parent record 206, and child records 222, 224, and 226 are associated with parent record 208. Note that although data source 202 contains three parent records, the number of parent records can be more or less depending on the number of transactions that have occurred. Also note that although each parent record in FIG. 2 is associated with three child records, each parent record can be associated with more or less child records depending on the number of items included in a given transaction.

Data source 202 also includes metadata 228, which describes the data structure of data source 202. In one embodiment of the present invention, metadata 228 includes the fields that are present in data source 202 and includes information about the fields. In one embodiment of the present invention, the information about the fields includes, but is not limited to, a field ID, a field name, a field label, and a field hint. Note that a field name is a database-specific name for a field, a field label is a name of a field that a user sees in application 230, and a field hint is text that is displayed when a user places a mouse pointer on top of a field displayed within application 230.

In one embodiment of the present invention, metadata 228 is stored in an extensible markup language (XML) file. In other embodiments of the present invention, metadata 228 is stored in a flat file, in a database, or in any data structure now known or later developed.

In one embodiment of the present invention, a vendor generates template document 232. Note that an exemplary template document is illustrated in FIG. 3A in accordance with an embodiment of the present invention.

In one embodiment of the present invention application 230 uses template document 232 to generate multiple final documents 236 from data source 202. In one embodiment of the present invention, application 230 generates one final document for each parent record stored in data source 202. In another embodiment of the present invention, application 230 generates final documents 236 from multiple data sources.

In one embodiment of the present invention, application 230 includes a receiving mechanism (not shown), a flat-data-source-generation mechanism (not shown), and a document-generation mechanism (not shown). The receiving mechanism receives the template document and the data source. The flat-data-source-generation mechanism generates the flat data source. The document-generation mechanism generates the final document using the template document and the data source.

In one embodiment of the present invention, the user uses a filter to select a specified subset of parent records to include in final document 236. In this embodiment, application 230 only generates final documents for the specified parent records.

In one embodiment of the present invention, application 230 first generates intermediate document 234 before generating final documents 236. In this embodiment, application 230 generates multiple intermediate documents from template document 232. In one embodiment of the present invention, application 230 generates an intermediate document for each parent record in data source 202. In another embodiment of the present invention, application 230 generates an intermediate document for each parent record specified by a filter for data source 202.

In one embodiment of the present invention, application 230 generates final documents 236 from intermediate documents 234 and data source 202. Note that this process is described in detail in reference to FIGS. 3 to 11.

In one embodiment of the present invention, application 230 generates a single final document from a single intermediate document and a data source. In this embodiment, application 230 creates a replica of the template document for each parent record to be included in the final document and places the replica on a different page of the final document. Note that the process described in FIGS. 3 to 11 can be applied to this embodiment.

In one embodiment of the present invention, the template is a template for a letter and the final document is a letter.

In one embodiment of the present invention, the application is Quickbooks® Point of Sale. Note that QuickBooks is a trademark and service mark of Intuit Inc., registered in the United States and other countries.

Template Document

FIG. 3A presents an exemplary template document 302 in accordance with an embodiment of the present invention. Template document 302 includes text and one or more mail merge fields. In FIG. 3A, a user inserts the following mail merge fields CUSTOMER NAME, RECEIPTNO, ITEMNO, DESCRIPTION, QUANTITY, UNITPRICE, AMOUNT, TOTAL, VENDOR NAME, and DATE. The mail merge fields correspond to fields in data source 202. In one embodiment of the present invention, fields CUSTOMER NAME, RECEIPTNO, TOTAL, VENDOR NAME, and DATE are fields in parent records. In another embodiment of the present invention, fields ITEMNO, DESCRIPTION, QUANTITY, UNITPRICE, and AMOUNT are fields in child records.

In one embodiment of the present invention, prior to generating final documents 236, application 230 generates a list of fields present in template document 302. FIG. 3B presents a list of fields extracted from the exemplary template document 302 in accordance with an embodiment of the present invention. The fields in template document 302 include CUSTOMER NAME, RECEIPTNO, ITEMNO, DESCRIPTION, QUANTITY, UNITPRICE, AMOUNT, TOTAL, VENDOR NAME, and DATE. One embodiment of the present invention compares the generated list of fields to a list of all possible fields in the data source to determine whether the mail merge fields within template document 302 are valid.

Flat Data Source

Figure 4:
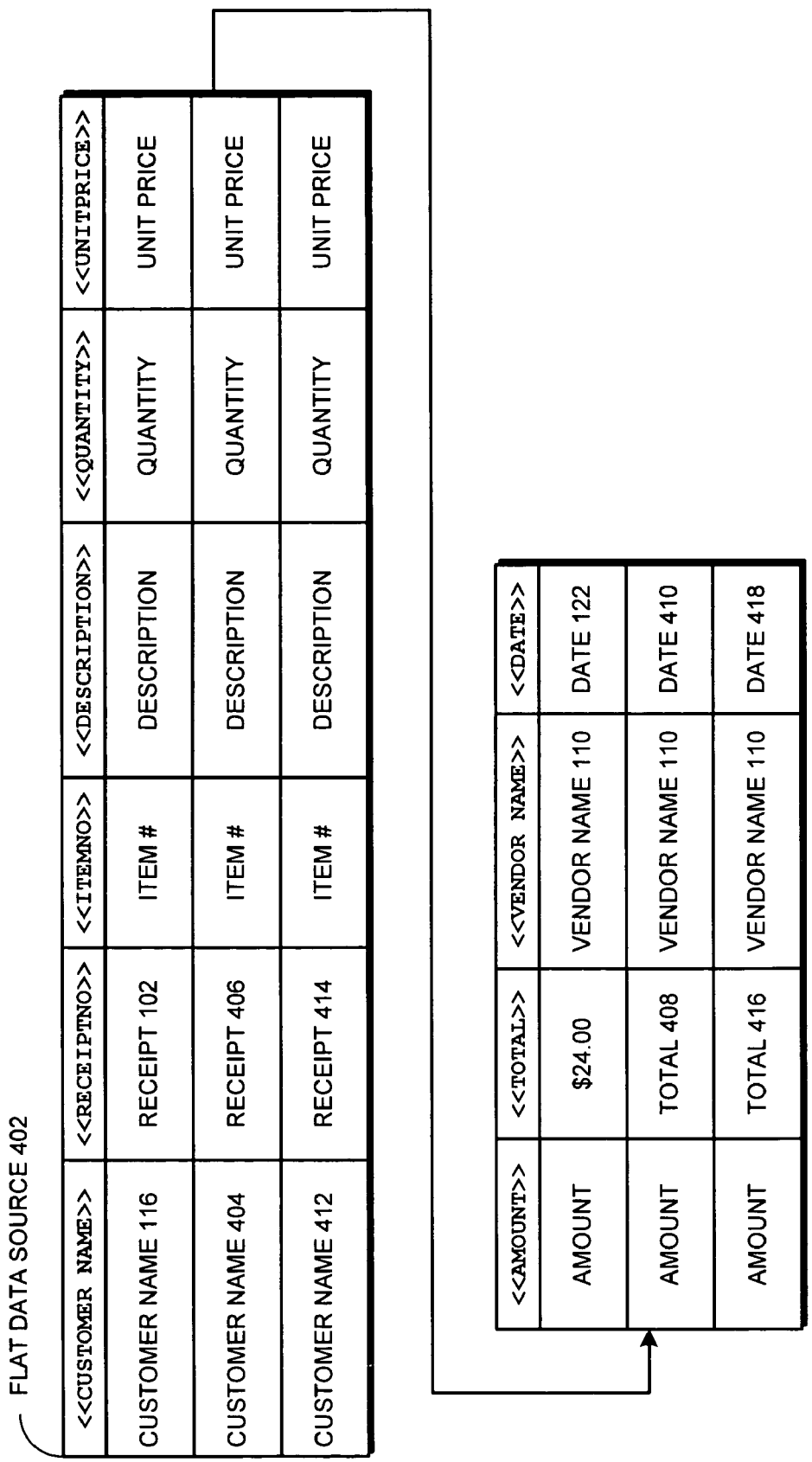
FIG. 4 presents an exemplary flat data source in accordance with an embodiment of the present invention.

In one embodiment of the present invention, application 230 generates a flat data source from data source 202. In doing so, values for fields in the parent records are imported into the flat data source. In contrast, column names for the fields that correspond to the child records are imported into the flat data source. FIG. 4 presents an exemplary flat data source 404 in accordance with an embodiment of the present invention. Note that flat data source 404 contains ten columns, of which six are in the upper box, and the remaining four are in the lower box. Although FIG. 4 illustrates a data source with three records, each with ten columns, flat data source 404 can include more or less records and/or columns.

As illustrated in FIG. 4, the first record corresponds to a customer with customer name 116, who made a purchase from vendor 110 on date 122 recorded in receipt 102. Note that this record corresponds to receipt 102 in FIG. 1. The fields for ITEMNO, DESCRIPTION, QUANTITY, UNITPRICE, and AMOUNT are populated with the column names for the columns in the child records that correspond to the fields, and are not populated with the actual data from the child records. The column names are extracted from metadata 228. Similarly, the second record corresponds to a customer with customer name 404, who made a purchase from vendor 110 on date 410 recorded in receipt 408. The total for receipt 406 is total 408. The third record corresponds to a customer with customer name 412, who made a purchase from vendor 110 on date 418 recorded in receipt 414. The total for receipt 414 is total 416.

Intermediate Documents

FIG. 5A presents an exemplary intermediate document 502 that corresponds to the exemplary receipt in FIG. 1 in accordance with an embodiment of the present invention. Application 230 populates the mail merge fields within template document 302 to generate intermediate document 502 for receipt 102. As illustrated in FIG. 5A, the mail merge fields CUSTOMER NAME, RECEIPTNO, TOTAL, VENDOR NAME, and DATE are populated with the values customer name 116, 102, $24.00, vendor name 110, and date 122, respectively. The mail merge fields ITEMNO, DESCRIPTION, QUANTITY, UNITPRICE, and AMOUNT are populated with the column names "ITEM #," "DESCRIPTION," "QUANTITY," "UNIT PRICE," and "AMOUNT," respectively.

FIG. 5B presents another exemplary intermediate document in accordance with an embodiment of the present invention. Application 230 populates the mail merge fields within template document 302 to generate intermediate document 504 for receipt 406. As illustrated in FIG. 5B, the mail merge fields CUSTOMER NAME, RECEIPTNO, TOTAL, VENDOR NAME, and DATE are populated with the values customer name 404, 406, total 408, vendor name 110, and date 410, respectively. The mail merge fields ITEMNO, DESCRIPTION, QUANTITY, UNITPRICE, and AMOUNT are populated with the column names "ITEM #," "DESCRIPTION," "QUANTITY," "UNIT PRICE," and "AMOUNT," respectively.

FIG. 5C presents another exemplary intermediate document in accordance with an embodiment of the present invention. Application 230 populates the mail merge fields within template document 302 to generate intermediate document 506 for receipt 414. As illustrated in FIG. 5B, the mail merge fields CUSTOMER NAME, RECEIPTNO, TOTAL, VENDOR NAME, and DATE are populated with the values customer name 412, 414, total 416, vendor name 110, and date 418, respectively. The mail merge fields ITEMNO, DESCRIPTION, QUANTITY, UNITPRICE, and AMOUNT are populated with the column names "ITEM #," "DESCRIPTION," "QUANTITY," "UNIT PRICE," and "AMOUNT," respectively.

In one embodiment of the present invention, intermediate documents 502, 504, and 506 can be represented using a single intermediate document in which the contents of each intermediate document 502, 504, and 506 are separated by a marker, such as a page break.

Field Map

In one embodiment of the present invention, prior to generating the final documents, a field map is generated which maps mail merge fields in the template document to columns in the child records. FIG. 6A presents an exemplary field map 602 that provides a mapping between mail merge fields in template document 302 and columns in the child records in accordance with an embodiment of the present invention. As illustrated in FIG. 6A, field map 602 maps each column of a given table within template document 302 to a mail merge field. Hence, column 1 in table 1 is mapped to ITEMNO, column 2 is mapped to DESCRIPTION, column 3 is mapped to QUANTITY, column 4 is mapped to UNITPRICE, and column 5 is mapped to AMOUNT.

In one embodiment of the present invention, for each table within the template document, the field map maps mail merge fields to columns in the child records. FIG. 6B presents another exemplary field map 604 in accordance with an embodiment of the present invention. In this example, the template document that corresponds to field map 604 contains three tables. Field map 604 maps columns in tables 606, 608, and 610 of the corresponding template document as follows. Columns 1-4 in table 606 are mapped to fields 612, 614, 616, and 618, respectively. Columns 1-2 in table 608 are mapped to fields 620 and 622, respectively. Columns 2-4 in table 610 are mapped to fields 624, 626, and 628, respectively.

Final Documents

In one embodiment of the present invention, a final document is generated for each intermediate document using the data source and the mapping. In this embodiment the columns in the table within a given intermediate document are populated with the data from the columns of the child records associated with the parent record that corresponds to the intermediate document.

FIG. 7A presents an exemplary final document 702 that corresponds to intermediate document 502 in FIG. 5A in accordance with an embodiment of the present invention. Application 230 generates final document 702 from intermediate document 502, data source 202, and field map 602. As illustrated, application 230 imports data from the appropriate columns of the child records associated with receipt 102.

FIG. 7B presents an exemplary final document that corresponds to intermediate document 504 in FIG. 5B in accordance with an embodiment of the present invention. In this example, the customer only purchased a single item 706 which has description 708, quantity 710, unit price 712, and amount 714. Similarly, FIG. 7C presents an exemplary final document 716 that corresponds to intermediate document 506 in FIG. 5C in accordance with an embodiment of the present invention. In this case, the customer purchased two items: (1) item 718 which has description 720, quantity 722, unit price 724, and amount 726, and (2) item 728 which has description 730, quantity 732, unit price 734, and amount 736.

In one embodiment of the present invention, final documents 702, 704, and 716 can be contained within a single document, wherein the contents of each final document 702, 704, and 716 are separated by a marker, such as a page break.

Generating Final Documents

Figure 8:
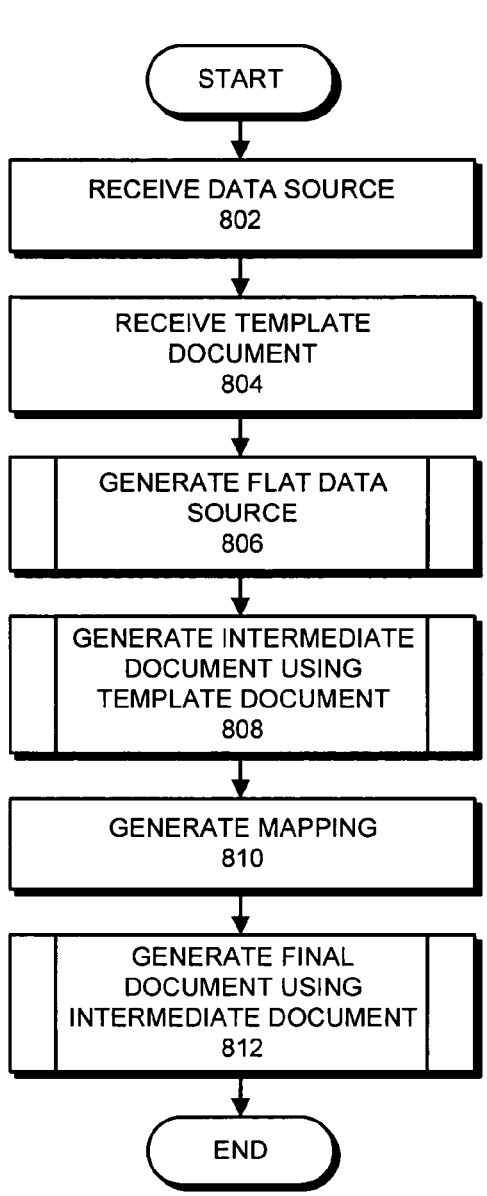
FIG. 8 presents a flow chart illustrating the process of generating multiple documents from a data source in accordance with an embodiment of the present invention.

FIG. 8 presents a flow chart illustrating the process of generating multiple documents from a data source in accordance with an embodiment of the present invention. The process begins when the system receives a data source, which includes parent records, child records, and metadata which describes the data stored in the parent and child records (step 802). In one embodiment of the present invention, a parent record is associated with one or more child records. The system also receives a template document which includes one or more tables (step 804). Next the system generates a flat data source from the data source, wherein the flat data source includes column names for the one or more tables in the template document (step 806). Note that step 806 is discussed in more detail in reference to FIG. 9 below. The system then generates an intermediate document using the template document (step 808). Step 808 is discussed in more detail in reference to FIG. 10 below.

Next, the system generates a mapping between the columns in the tables within the template document and the columns in the child records (step 810). The system then generates a final document by using the child records to populate rows in the tables within the intermediate document (step 812). Step 812 is described in more detail in reference to FIG. 11 below.

Figure 9:
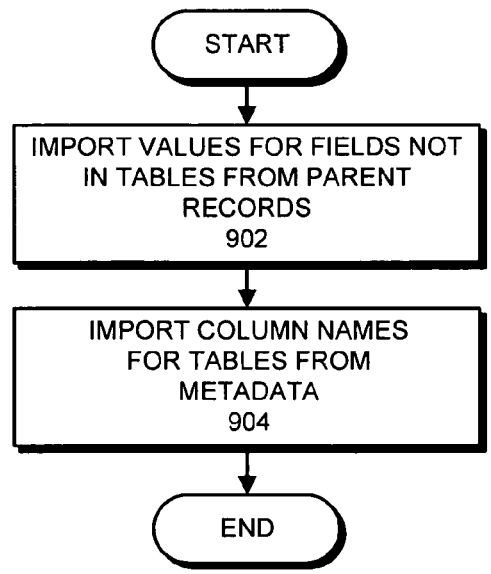
FIG. 9 presents a flow chart illustrating the process of generating a flat data source from a data source in accordance with an embodiment of the present invention.

FIG. 9 presents a flow chart illustrating the process of generating a flat data source from a data source in accordance with an embodiment of the present invention. The process begins when the system imports values for the fields that are not in the tables from the parent records into the flat data source (step 902), and imports column names for the tables from the metadata into the flat data source (step 904).

Figure 10:
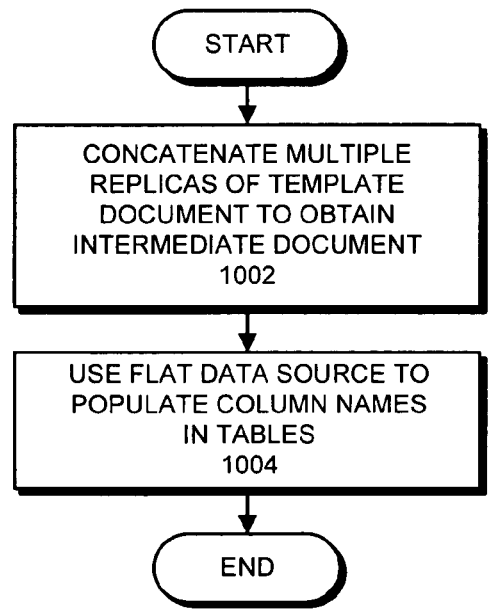
FIG. 10 presents a flow chart illustrating the process of generating an intermediate document in accordance with an embodiment of the present invention.

FIG. 10 presents a flow chart illustrating the process of generating an intermediate document in accordance with an embodiment of the present invention. The system concatenates multiple replicas of the template document to obtain an initial version of the intermediate document (step 1002). The system then uses the flat data source to populate the column names in the tables within the initial version of the intermediate document (step 1004).

In one embodiment of the present invention, if the template document includes fields that are not in the one or more tables, after obtaining the initial version of the intermediate document, the system uses the parent records to populate the fields that are not in the tables within the intermediate document. Specifically, for each parent record whose data is to be included in the final document, the system identifies a section of the intermediate document that is associated with the parent record, and populates fields that are not in the tables within the identified section using data from the parent record.

Figure 11:
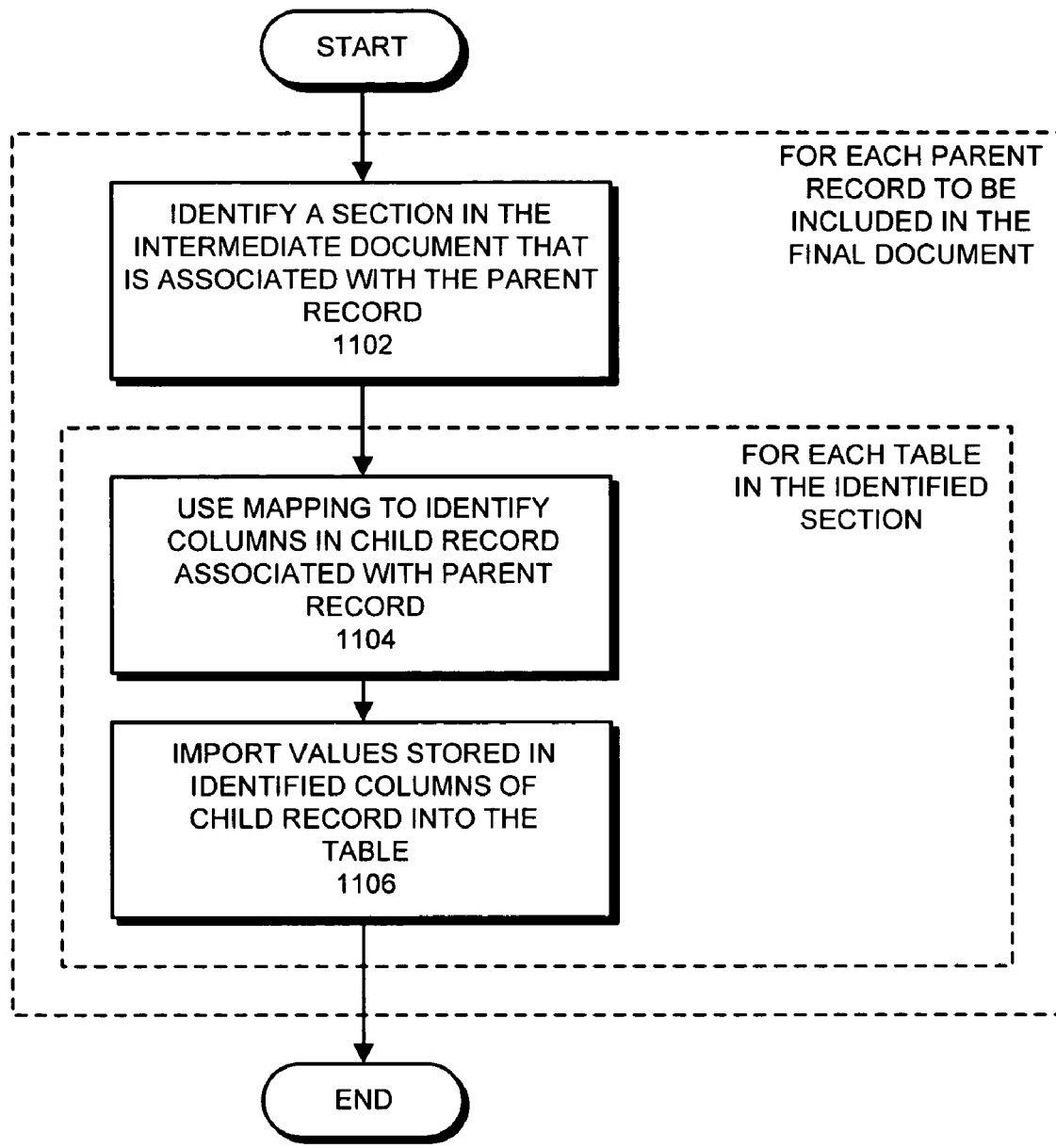
FIG. 11 presents a flow chart illustrating the process of generating a final document from an intermediate document in accordance with an embodiment of the present invention.

In one embodiment of the present invention, mail merge functionality is used to concatenate multiple replicas of the template document to obtain the initial version of the intermediate document and to use the flat data source to populate the column names in the tables within the initial version of the intermediate document FIG. 11 presents a flow chart illustrating the process of generating a final document from an intermediate document in accordance with an embodiment of the present invention. The process begins when for each parent record whose data is to be included in the final document, the system identifies a section in the intermediate document that is associated with the parent record (step 1102). In one embodiment of the present invention, for a given table within the intermediate document, a table index is calculated. In one embodiment of the present invention, the table index is the sum of: (a) the index of the parent record multiplied by the number of tables in the template document, and (b) the index of the given table within the intermediate document being processed. The system then uses the table index to locate the table within the intermediate document for the parent record. In one embodiment of the present invention, instead of generating a single intermediate document, multiple intermediate documents are generated, each being a replica of the template document. Hence, when using the table index to locate the table that corresponds to a given parent record, the table is located within the multiple intermediate documents. In this embodiment, the system generates a final document for each parent record.

For each table in the identified section, the system uses the mapping to identify columns in the child records associated with the parent record that are to be imported into the table (step 1104), and imports the values stored in the identified columns of the child records into the table (step 1106).

In one embodiment of the present invention, the system imports data from the child records into a given table within the intermediate document as follows. The system first calculates a row index for a child record that is to be imported into the given table within the intermediate document. The row index indicates which row of the given table is to receive the data contained in the child record. In one embodiment of the present invention, the row index is incremented sequentially after each child record is imported into the given table. If the row index for a given child record exceeds the number of rows available in the given table, another row is added to the given table. The system then uses the field mapping to determine which columns from the given child record, if any, are to be imported into the given table, and imports those columns into the given table within the intermediate document. The final document is the result of performing this process for all child records to be included in the final document.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating multiple documents using a template document, comprising:
   receiving a hierarchical data source, which includes a parent record comprising a parent field, multiple child records associated with the parent record, and metadata which describes data stored in the parent and child records, wherein a child record comprises one or more child fields, and wherein names for the child fields are stored in the metadata;
   receiving the template document which includes a table with one or more columns;
   generating a flat data source from the hierarchical data source, wherein a respective record in the flat data source includes a value for the parent field and names for the child fields, wherein the names for the child fields are extracted from the metadata;
   in response to generating the flat data source, generating an intermediate document using the template document by:
      populating a document field that is not in the table within the template document using the value for the parent field included in the flat data source; and
      populating column names in the table within the template document using the names for the child fields included in the flat data source, wherein generating the intermediate document using the template document involves using mail merge functionality; and
   in response to generating the intermediate document, generating a final document by populating values of the child fields in the table within the intermediate document.

2. The method of claim 1, further comprising concatenating multiple replicas of the template document to obtain an initial version of the intermediate document.

3. The method of claim 1, wherein using the value of the parent field to populate the document field involves:
   identifying a section of the intermediate document that is associated with the parent record; and
   populating the document field within the identified section using the value of the parent field included in the parent record.

4. The method of claim 1, wherein generating the flat data source involves:
   importing the value of the parent field from the parent record into the flat data source; and
   importing column names for the table from the metadata into the flat data source.

5. The method of claim 1, wherein after generating the intermediate document, the method further comprises generating a mapping between the columns in the tables within the template document and the columns in the child records.

6. The method of claim 5, wherein generating the final document involves:
for each parent record whose data is to be included in the final document,
identifying a section in the intermediate document that is associated with the parent record, and
for each table in the identified section,
using the mapping to identify columns in the child records associated with the parent record that are to be imported into the table; and
importing the values stored in the identified columns into the table.

7. The method of claim 1, wherein the records include at least one of:
a purchase order document;
a customer order document;
a receiving document;
a sales receipt;
a transfer document;
an adjustment memo;
a work order document; and
a lay away document.

8. A non-transitory computer-readable storage medium storing instructions that when executed by a computer cause the computer to perform a method for generating multiple documents using a template document and a data source, comprising:
receiving a hierarchical data source, which includes a parent record comprising a parent field, multiple child records associated with the parent record, and metadata which describes data stored in the parent and child records, wherein a child record comprises one or more child fields, and wherein names for the child fields are stored in the metadata;
receiving the template document which includes a table with one or more columns;
generating a flat data source from the hierarchical data source, wherein a respective record in the flat data source includes a value for the parent field and names for the child fields, wherein names for the child fields are extracted from the metadata;
in response to generating the flat data source, generating an intermediate document using the template document by:
populating a document field that is not in the table within the template document using the value for the parent field included in the flat data source; and
populating column names in the table within the template document using the names for the child fields included in the flat data source wherein generating the intermediate document using the template document involves using mail merge functionality; and
in response to generating the intermediate document, generating a final document by populating values of the child fields in the table within the intermediate document.

9. The computer-readable storage medium of claim 8, wherein the method further comprises concatenating multiple replicas of the template document to obtain an initial version of the intermediate document.

10. The computer-readable storage medium of claim 8, wherein using the value of the parent field records to populate the document field involves:
identifying a section of the intermediate document that is associated with the parent record; and
populating the document field within the identified section using the value of the parent field included in the parent record.

11. The computer-readable storage medium of claim 8, wherein generating the flat data source involves:
importing fields the value for the parent field from the parent record into the flat data source; and
importing column names for the table from the metadata into the flat data source.

12. The computer-readable storage medium of claim 8, wherein after generating the intermediate document, the method further comprises generating a mapping between the columns in the tables within the template document and the columns in the child records.

13. The computer-readable storage medium of claim 12, wherein generating the final document involves:
for each parent record whose data is to be included in the final document,
identifying a section in the intermediate document that is associated with the parent record, and
for each table in the identified section,
using the mapping to identify columns in the child records associated with the parent record that are to be imported into the table; and
importing the values stored in the identified columns into the table.

14. The computer-readable storage medium of claim 8, wherein the records include at least one of:
a purchase order document;
a customer order document;
a receiving document;
a sales receipt;
a transfer document;
an adjustment memo;
a work order document; and
a lay away document.

15. A computer system that generates multiple documents using a template document, comprising:
a memory configured to store a flat data source;
a receiving mechanism configured to:
receive a hierarchical data source, which includes a parent record comprising a parent field, multiple child records associated with the parent record, and metadata which describes the data stored in the parent and child records, wherein a child record comprises one or more child fields, and wherein names for the child fields are stored in the metadata; and to
receive the template document which includes a table with one or more columns;
a flat data source generation mechanism configured to generate a flat data source from the hierarchical data source, wherein a respective record in the flat data source includes a value for the parent field and names for the child fields, wherein the names for the child fields are extracted from the metadata; and
a document generation mechanism configured to:
in response to generating the flat data source, generate an intermediate document using the template document by:
populating a document field that is not in the table within the template document using the value for the parent field included in the flat data source; and
populating column names in the table within the template document using the names for the child fields associated with the record included in the flat data source, wherein the document generation mechanism is further configured to generate the intermediate document using mail merge functionality; and to generate a final document in response to generating the intermediate document by populating values of the child fields in the table within the intermediate document.

16. The computer system of claim 15, wherein while generating the intermediate document using the template document, the document generation mechanism is configured to concatenate multiple replicas of the template document to obtain an initial version of the intermediate document.

17. The computer system of claim 15, wherein while using the parent records to populate the document field, the document generation mechanism is configured to:
identify a section of the intermediate document that is associated with the parent record; and to
populate the document field within the identified section using the value of the parent field included in the parent record.

18. The computer system of claim 15, wherein while generating the flat data source, the flat data source generation mechanism is configured to:
import the value for the document field from the parent record into the flat data source; and to import column names for the table from the metadata into the flat data source.

19. The computer system of claim 15, wherein after generating the intermediate document, the document generation mechanism is configured to generate a mapping between the columns in the tables within the template document and the columns in the child records.

20. The computer system of claim 19, wherein while generating the final document, the document generation mechanism is configured to:
for each parent record whose data is to be included in the final document, to
identify a section in the intermediate document that is associated with the parent record, and
for each table in the identified section, to
use the mapping to identify columns in the child records associated with the parent record that are to be imported into the table; and to
import the values stored in the identified columns into the table.

21. The computer system of claim 15, wherein the records include at least one of:
a purchase order document;
a customer order document;
a receiving document;
a sales receipt;
a transfer document;
an adjustment memo;
a work order document; and
a lay away document.

* * * * *

UNITED STATES PATENT AND TRADEMARK OFFICE
CERTIFICATE OF CORRECTION

| | | |
|---|---|---|
| PATENT NO. | : 7,870,485 B2 | |
| APPLICATION NO. | : 11/495851 | |
| DATED | : January 11, 2011 | |
| INVENTOR(S) | : Alexander Seliutin et al. | |

It is certified that error appears in the above-identified patent and that said Letters Patent is hereby corrected as shown below:

In claim 10 (at column 11, line 61), please remove the word "records".

In claim 11 (at column 12, line 3), please remove the word "fields".

Signed and Sealed this
Twenty-sixth Day of April, 2011

David J. Kappos
*Director of the United States Patent and Trademark Office*